United States Patent

[11] 3,593,004

[72] Inventor Le Roy J. Ryan, Jr.
5300 W. Hutchinson, Chicago, Ill. 60641

[21] Appl. No. 773,041
[22] Filed Nov. 4, 1968
[45] Patented July 13, 1971

[54] STATIC CARD READER HAVING PULSE OUTPUT
14 Claims, 2 Drawing Figs.

[52] U.S. Cl. .......... 235/61.11, 250/219
[51] Int. Cl. .......... G01m21/30, G06k 7/10
[50] Field of Search .......... 235/61.11, 61.8; 250/219

[56] References Cited

UNITED STATES PATENTS

| | | | |
|---|---|---|---|
| 2,750,113 | 6/1956 | Coleman .......... | 235/61.11 |
| 2,913,172 | 11/1959 | Stedelin et al. .......... | 235/61.8 |
| 2,921,204 | 1/1960 | Hastings et al. .......... | 250/219 IDD |
| 3,028,081 | 4/1962 | Knight .......... | 235/61.11 |
| 3,065,356 | 11/1962 | Blake et al. .......... | 235/61.11 |
| 3,173,000 | 3/1965 | Johnson et al. .......... | 235/61.11 |
| 3,467,820 | 9/1969 | Droege et al. .......... | 235/61.11 |

*Primary Examiner*—Maynard R. Wilbur
*Assistant Examiner*—Thomas J. Sloyan
*Attorney*—Kinzer, Dorn and Zickert

ABSTRACT: Optical card reader adapted to read punched information from a card having a plurality of columns of decade digital information, wherein the reader generates light pulses corresponding to the digital value of each column and converts the light pulses into electrical signals that are in turn converted into a digital output.

Figure 1:
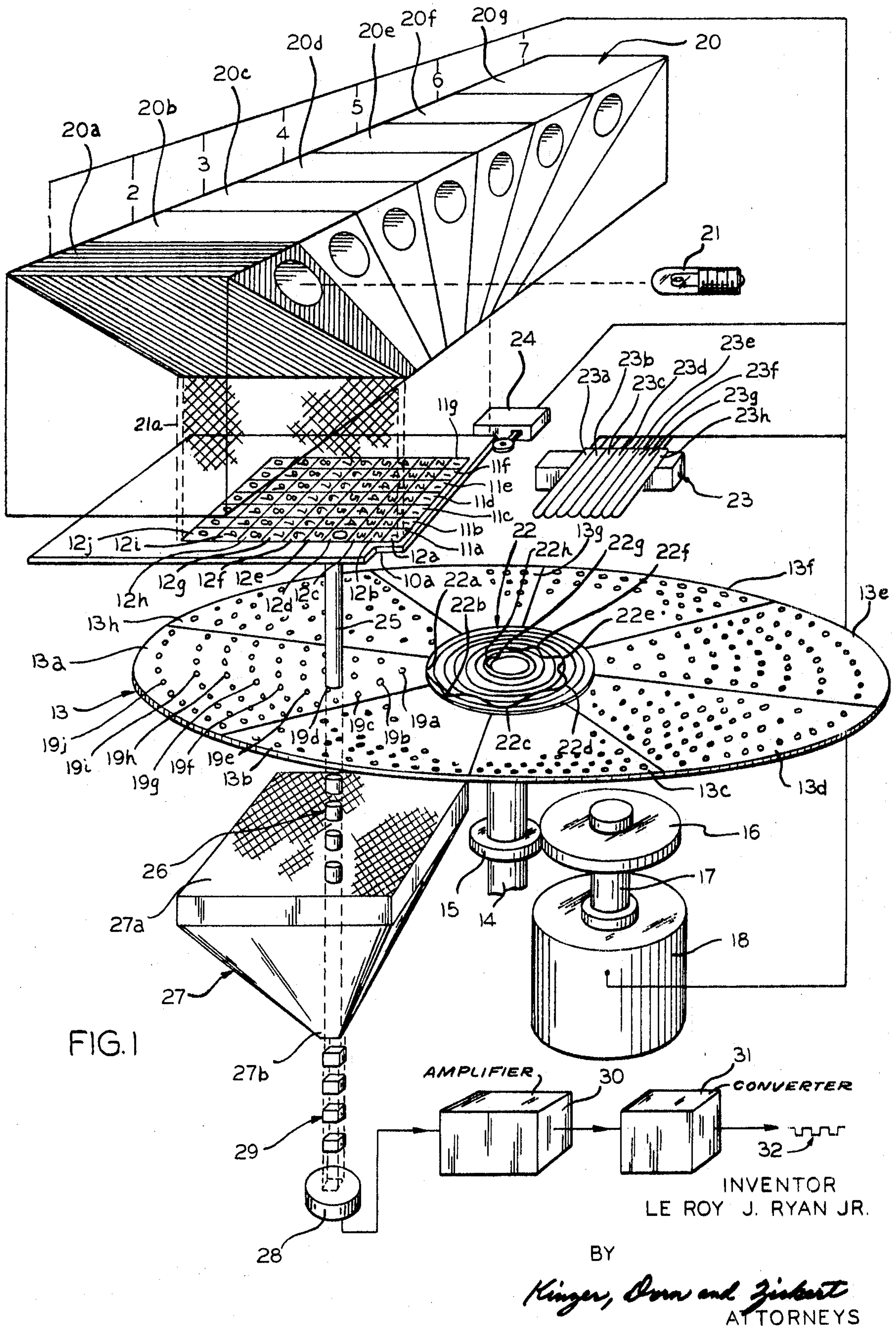

INVENTOR
LE ROY J. RYAN JR.
BY
Kinzer, Dorn and Zickert
ATTORNEYS

INVENTOR
LE ROY J. RYAN JR

BY

Kinzer, Dorn and Zickert
ATTORNEYS

STATIC CARD READER HAVING PULSE OUTPUT

This invention relates in general to an apparatus for reading punched cards where information or data is punched into the card, such as for a business transaction, and more particularly to an optical card reader for reading information from a punched card, and still more particularly to an optical card reader adapted for reading digital information from a card having punched holes therein.

The card reader of the present invention is especially suitable for quickly converting punched, digital information from a card to a suitable digital output that may be used at an information storage center. A typical card would have any number of columns with digital information representing the values, wherein any selected value for each column is shown by punching a hole through the card at the location of the digital value in a chosen column. Use of the information may involve a business establishment that would honor a credit card, and with the reader, would be able to immediately transmit a transaction conducted with the credit card holder to a centrally located accounting department that would in turn bill out the transaction. Another use would be where the cards are of a standard size, readily available in any office supply store, that could be handpunched with phone numbers to be used in calling often-called business associates. In this respect, the cards would be very inexpensively made.

The card reader receives a punched card and converts the punched information into light pulses, which are then converted into electrical pulses, the latter of which may be converted into a contact closure output that may be utilized at a data storage center. A source of light coacts with a light pulse generator. The digital value of a punched hole in a card is converted to a series of light pulses of the same number as the digital value by the light pulse generator. Conversion of the light pulses into electrical pulses is accomplished by a light-sensitive means such as a photocell. The electrical pulse output of the photocell may then be amplified to operate a relay of solid-state circuitry for producing a digital output. In order to read the value of each column on the card, a step means synchronized in operation with the light pulse generator provides sequential reading of the columns in any desired order. A circuit means is also provided that may be initially energized by the punched card for assuring the card is properly inserted and for driving the reader through a cycle of operation that will enable it to read the digital value of each column on the card. However, a start switch may be employed for initiating the reading cycle. Termination of the cycle may be accomplished by the light pulse generator upon completion of the reading of each column, or by any other suitable means.

Accordingly, it is an object of the present invention to provide a new and improved apparatus for reading punched information from a card or the like.

Another object of this invention is in the provision of an optical card reader for quickly and efficiently reading punched information from a card.

A still further object of this invention resides in the provision of an optical card reader capable of reading punched information from a card that in no way causes any wear on the card.

Another object of this invention is in the provision of an optical card reader capable of accepting a standard readily available card that may be easily hand punched with desired digital information.

A further object of this invention is to provide an optical card reader for reading punched information from a card by first converting the information into light pulses, next converting the light pulses into electrical pulses, and finally converting the electrical pulses into a digital output.

Figure 2:
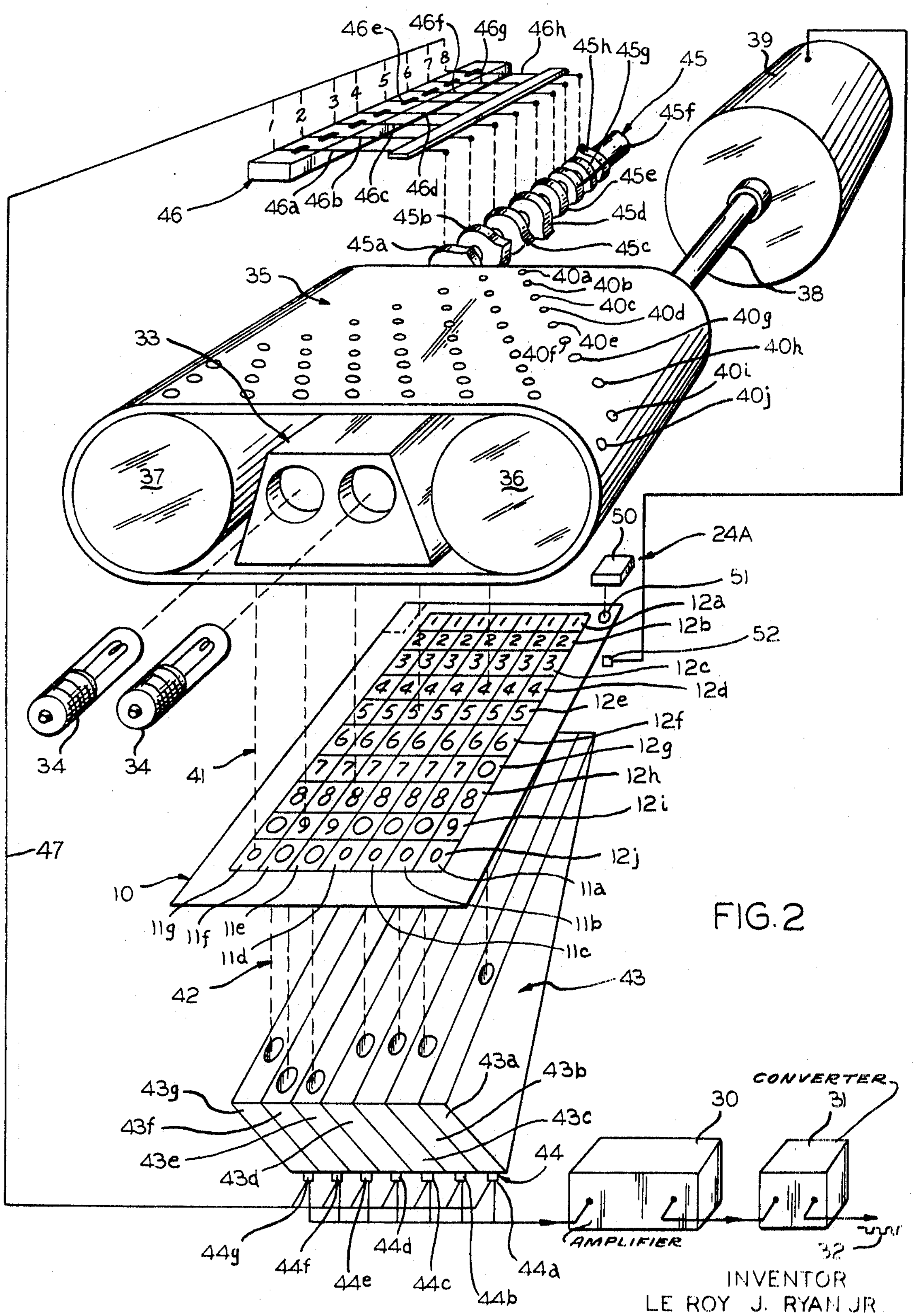

Other objects, features and advantages of the invention will be apparent from the following detailed disclosure, taken in conjunction with the accompanying sheets of drawings, wherein like reference numerals refer to like parts, in which:

FIG. 1 is a perspective, partially diagrammatic and partially schematic view, of a card reader according to the present invention; and FIG. 2 is a perspective, partially diagrammatic and partially schematic view, of another embodiment of the invention.

Referring now to the embodiment of FIG. 1, a punched card 10 is illustrated in association with a card reader of the invention as it is being read. This card may be of any suitable sheet material such as plastic or cardboard. For example, it may be a standard three-by-five card readily available from any office supply outlet, which may have typed or written thereon certain legend identifying information and digital information punched in to enable use with the card reader of the invention. This eliminates a need for a special punched card that would obviously be more expensive. The card is preferably of a material that will stand considerable wear without affecting the punched data. The card includes a plurality of side-by-side vertically arranged columns 11 of digital information and as a whole making up a plurality of horizontally arranged rows 12. Each column includes digital spaces representing the values 1 to 10. The columns are specifically designated **11*a*—11*g*, while the rows are designated 12*a*—12*j*. The "10" space is here represented by the legend "0" although it is not necessary to even show the digital legends. A card may have any number of columns 11, while each column will include 10 digital spaces representing the values 1 to 10, and the entire digital information on a card will therefore be represented by a plurality of columns and a plurality of rows. The columns will essentially extend vertically, while the rows will extend essentially horizontally; although in order to render the information on the card 10 in an orientation for reading by the card reader of FIG. 1, the rows have a slightly curved pattern, which corresponds to the curvature of holes formed in the scanning disc 13**, the latter constituting generally the light pulse generator.

The light pulse generator or scanning disc 13 is in the form of a disc-shaped member of opaque substance that is center mounted on a shaft 14. While not shown, the shaft 14 would be suitably mounted for rotation. A pinion gear is mounted on the shaft 14, which engagement with a drive gear 16 is carried on a motor shaft 17 of a motor 18. When the scanning disc 13 is rotated, it is driven at a constant speed by the motor 18.

The scanning disc 13, as illustrated, is divided into eight pie-shaped segments **13*a*, 13*b*, 13*c*, 13*d*, 13*e*, 13*f*, 13*g* and 13*h*, which in turn are provided with a set of light pulse forming holes including 10 rows of holes 19*a* to 19*j*. However, the disc may be divided into any number of segments depending upon the number of columns to be read and the synchronization between reading columns and the segments employed for producing light pulses. Each row has a different number of holes corresponding to the digital value of the rows 12*a*—12*j* on the punch card 10. Accordingly, the first row 19*a* would have a single hole, while the last row 19*j* would have 10 holes, which would correspond to the digital values 1 to 10 of each column 11 on the punched card. While eight pie-shaped segments 13** are illustrated on the scanning disc, this being one more than the number of columns of the punched card, it should be appreciated that there must be a number of pie-shaped segments at least equal to the number of columns on a punched card and that any number may be provided.

Coacting with the light generator 13 is a source of light 20 that functions as a light director to successively define rectangular light columns sequentially in alignment with the columns 11 of digital information on the card. While the light source may take any desirable form, it is herein illustrated as including a plurality of wedge-shaped, clear Lucite sections **20*a* to 20*g*, each being aligned for respectively reading the columns 11*a* to 11*g* of the punched card. Lamps 21 are provided for each of the wedge-shaped sections and are suitably connected into electrical circuitry to be operated sequentially in synchronism with the rotation of the scanning disc 13. Accordingly, it will be appreciated that each wedge-shaped section of the light source 20 will provide a rectangular light column for respectively impinging upon the columns of digital information on the punched card. As shown in FIG. 1, the wedge-shaped section 20***a* is represented as being energized and as casting the rectangular light column 21*a* onto one of the rows of digital information on the punched card 10. In order to prevent relative interference of light energy between adjacent, wedge-shaped sections, the adjoining faces of the sections may be painted black. Any other suitable device may be employed as a light source for sequentially directing light on the columns.

As already explained, the digital information on the card is read column by column sequentially, such as reading column 11*a* first and sequentially the columns 11*b*, 11*c*, 11*d*, 11*e*, 11*f* and 11*g*. Thus, the wedge-shaped sections 20*a* to 20*g* would be sequentially energized and deenergized during rotation of the scanning disc or light pulse generator 13.

Coordination of the sequential reading of the columns of digital information with the production of sets of light pulses is accomplished by a cam means 22 mounted on and rotatable with the scanning disc 13 and having a plurality of cam lobes 22*a* to 22*h*, wherein the cam lobes function to operate a switch means 23 for switch contacts 23*a* to 23*h*. Initiation of a reading cycle may be achieved by actuation of a limit switch detector 24 as the punch card 10 is moved into reading position. The detector also assures proper placement of the card in the reader, as the upper right-hand corner of the card (when reviewed upright) is notched at 10*a*, so that upside down placement of the card in the reader will not actuate the switch 24. Alternately, the switch 24 may perform only as an interlock in the starting circuit to solely assure proper placement of a card in the reader. In that case, a separate pushbutton switch or the equivalent may be provided for starting the cycle. The scanning disc 13 would then begin rotation at a constant speed starting from home position, wherein the cam lobe 22*a* would actuate the switch contacts 23*a* for energizing the wedge-shaped section 20*a* of the light source for reading of the first column of digital information on the card. Sequentially, the cam lobes 22*b* to 22*g* would actuate the switch contacts 23*b* to 23*g* for energization of the wedge-shaped light sections 20*a* to 20*g* and effect the generation of light pulses in the value of the punched digit of each column on the punched card by the pie-shaped segments 13*b* to 13*g*. Thereafter, the cam lobe 22*h* would actuate the switch contacts 23*h* to signal the end of the reading cycle by stopping the rotation of the scanning disc 13.

In FIG. 1, generation of the light pulses relative to the first column of digital information is illustrated, wherein the digital space 12*d* representing the value "4" is punched, and with energization of the light source, wedge-shaped section 20*a*, a beam of light 25 is cast upon the scanning disc 13 in alignment with the row of holes 19*d*. Four holes are provided in the row 19*d* for the purpose of generating four light pulses when detecting the punched value "4" from the card. As the scanning disc 13 rotates, it "chops" the light beam 25 into a number of light pulses 26 equivalent to the digital value 4. Thus, the digital value on the card as punched is transformed or converted into light pulses by the scanning disc 13.

The output of the light pulse generator is delivered to a clear Lucite light collector 27, in the form of an inverted pyramid. Any form of light ray collecting lens may be used. The light pulses may strike any part of the input surface 27*a* of the light director, but will be discharged therefrom at a single point, that of the inverted apex 27*b*, so that it may be delivered into a photocell 28. Thus, the input pulses 26, which may impinge upon any part of the input surface 27*a* of the light director will be collected and concentrated to be discharged at the apex 27*b* in the form of "chopped" light signals or pulses 29.

A photocell 28 converts the light pulses 29 into electrical pulses or signals and delivers same to an amplifier 30 of any suitable type. Following amplification of the electrical pulses, they are delivered to solid-state circuitry 31 that converts the electrical pulses into a digital output 32 that may be used in any desirable equipment for recording the information read from the punched card 10. The signal condition may take any desired form, such as a relay or a solid-state device. Accordingly, the punched digital information on the card 10 is first optically and then electrically converted to an electrical digital signal output at a suitable data processing station.

The embodiment of FIG. 2 performs the identical functional result as the embodiment of FIG. 1 in optically reading punched, digital information from a card 10 and converting same into a digital output 32. This embodiment, however, utilizes a different mechanical approach in some respects. It is also important that this embodiment shows the use of a card having straight rows of digital information. Thus, the invention contemplates both straight and curved row configurations on cards.

The embodiment of FIG. 2 will have components marked with the same numbers as the embodiment of FIG. 1, where no change has been made. In this embodiment, the card 10 also is inserted into a suitable slot until it actuates a photoelectric detector 24A that initiates a reading cycle. The detector 24A includes a light source 50 arranged to cast a beam of light onto a corner of the card with the intention that it strike the upper right-hand corner and a punched hole 51 to strike and actuate a photocell 52 arranged below the card in alignment with the light source. In the event the card is not inserted properly, the photoelectric detector will not be actuated. The card 10 in FIG. 2 is illustrated with a corner hole 51, and a legend for notching the upper left-hand corner as either the detector of FIG. 1 or the detector of FIG. 2 may be employed. A light source 33 that includes an elongated, pyramid-shaped, Lucite block, having a plurality of lamps 34 therein is positioned between the upper and lower runs 35*a* and 35*b* of an endless belt 35 trained over a drive pulley 36 and an idler pulley 37. A drive shaft 38 of a motor 39 is connected to the drive pulley 36 for driving same and for driving the belt 35.

A set of light-pulsing holes including 10 rows of holes 40*a* to 40*g* are provided in the belt 35 to represent the reading or scanning area for generating light pulses in the same manner as one of the pie-shaped segments on the scanning disc 13 in the first embodiment. Another set of holes (not shown because of position below the light source) is also provided, although any number of sets of holes may be provided on the belt. Thus, the row 40*a* will have a single hole, while the succeeding rows will have additional holes up to 10 holes as in row 40*g*.

The entire card 10 has directed thereagainst "chopped" light or light pulses for each column in accordance with the digital values of each row during each traverse of the belt through a single revolution. Thus, the endless belt 30 serves as a light pulse generator to define "chopped" light or light pulses 41 for impinging upon the card 10. The "chopped" light output 42 of the punch card 10 will depend upon the punched holes in the card, and will be directed to a Lucite light collector 43 composed of a plurality of triangular-shaped wedges 43*a* 43*h*, one for each column of digital information on the car 10 and corresponding to the columns 11*a* to 11*g*. The wedges are preferably painted black on their adjoining surfaces to prevent light from passing therebetween.

As in the first embodiment, means is provided to convert the light pulses into electrical pulses, wherein photocells 44*a* to 44*g* in respective association with the wedges 43*a* to 43*h* and the digital columns 11*a* to 11*g* on the card 10, will convert the light pulses to electrical pulses and deliver same to the pulse amplifier 30. As also in the first embodiment, the amplification of the pulses is received by the signal conditioner 31 that converts the electrical pulses into the digital output 32.

The information from the punched card 10 is read sequentially by column, where the light pulses pass through the punched card with the punched holes for impinging upon the light collector 43. The outputs of photocells 44*a* to 44*g* are switched on and off in sequence by a cam means 45 driven from the idler pulley 37 and a switch contact means 46 connected to the photocell means 44 by a cable 47. The cam means includes cam lobes 45*a* to 45*g* for operating switches 46a to 46g and the photocells 44a to 44g in sequence. Also, cam lobe 45h actuates switch contact 46h for signalling the end of a reading cycle and for stopping the drive of the endless belt 35 and readying the detector 24a for the next reading operation. The light pulses as discharged from the card may strike any spot, on the input side of the wedges 43 and be discharged to strike the respective photocell 44.

Accordingly, it can be appreciated that the embodiment of FIG. 2 operates to read a punched card in the same manner as the embodiment of FIG. 1, while utilizing a slightly different apparatus.

It will be understood that modifications and variations may be effected without departing from the scope of the novel concepts of the present invention.

The invention I hereby claim is as follows:

1. An optical card reader for reading a stationary card of opaque material having a plurality of columns and rows of spaces wherein the spaces along the columns correspond to variable values and the spaces along the rows correspond to constant values and where certain spaces are modified to permit light to pass therethrough, said card reader comprising a stationary source of light, a light pulse generator including a movable member of opaque material arranged between the light source and light pulse converting means and having a set of light-passing spaces arranged as a plurality of rows corresponding to the rows of spaces on the card with the number of light-passing spaces in each row of the movable member corresponding to the value of the spaces of each card row, wherein the light-passing spaces of the movable member coact with a light-passing space of the card to produce pulsed light corresponding to a value which is a function of the coaction between the card and the movable member, said light pulse converting means receiving the light pulses and converting same into electrical pulses, and sequencing means causing the sequential reading of each column of spaces on the card.

2. An optical card reader for reading a stationary card having a plurality of columns and rows of digital spaces wherein the spaces along the columns represent the consecutive digital values of 1 to 10 and the spaces along the rows represent equal digital values and holes are punched in certain of said spaces, said card reader comprising a stationary source of light, a light pulse generator including movable means coacting with the punched holes and said light source for converting the digital value of the punched holes of each column into a series of light pulses of the number equaling the digital value, said movable means being arranged between the light source and stationary photocell means and including a member having a set of holes therethrough arranged as a plurality of rows of holes corresponding to the rows of digital spaces on the card with the number of holes in each row corresponding to the value of the digital spaces of each card row, said stationary photocell means receiving the light pulses and converting same into electrical pulses, means converting said electrical pulses into a digital output, and sequencing means causing the sequential reading and generation of digital outputs for each column of spaces on the card.

3. An optical card reader as defined in claim 2, and stationary light collector means arranged between the photocell means and the light pulse generator for receiving the light pulses and feeding them to the photocell means.

4. An optical card reader as defined in claim 2, and means for moving said member at a constant speed between the source of light and said photocell means, whereby the number of light pulses generated for any column will correspond to the punched digital value.

5. An optical card reader as defined in claim 4, wherein said light pulse generator member is disc shaped and includes a plurality of sets of holes.

6. An optical card reader as defined in claim 4, wherein said light pulse generator member is an endless belt and includes at least one set of holes.

7. An optical card reader as defined in claim 4, wherein said sequential means includes a plurality of sources of light, one for each column, cam means on said member, and switch means responsive to said cam means and controlling the sequential energization of the light sources.

8. An optical card reader as defined in claim 4, wherein said sequential means includes a source of light, said photocell means defined by a plurality of photocells, one for each column, cam means synchronously driven by said member, and switch means responsive to said cam means and controlling the sequential output of the photocells.

9. An optical card reader for reading a card having a plurality of columns and rows of digital spaces wherein the columns represent the consecutive digital values of 1 to 10 and the rows represent equal digital values and holes are punched in certain of said spaces, said card reader comprising a light pulse generator adapted to receive a column of coded light, a plurality of individually energizable light sources, one for each column of digital spaces on said card, said light sources being directed toward said card to cause a beam of light to be defined by a hole in the card at the punched digital value, said light pulse generator including a rotatably mounted disc positioned below the card to receive the beam of light therefrom, said disc having a plurality of sets of holes circumferentially arranged, each set including a plurality of arcuately arranged rows of holes corresponding to the rows of digital spaces on the card with the number of holes in each row corresponding to the value of the digital spaces of each card row, means for rotating said disc at constant speed, whereby the light beam impinging thereon is divided into light pulses in accordance with the digital value of the punched digital space, cam means on said disc, switch means actuable by said cam means to sequentially energize and deenergize the light sources in synchronism with the sets of holes in the disc, photocell means receiving the light pulse output from the light pulse generator and converting the light pulses into electrical pulses, and means converting the electrical pulses into a digital output.

10. An optical card reader as defined in claim 9, detector switch means operable by said card to determine whether the card is properly positioned with respect to the light pulse generator.

11. An optical card reader as defined in claim 9, detector switch means operable by said card to start said disc drive means to initiate a reading cycle and determine whether the card is properly positioned with respect to the light pulse generator, and stop switch means actuable by said cam means for stopping said disc drive means to complete a reading cycle and to reset said detector switch means.

12. An optical card reader for reading a card having a plurality of vertically arranged columns and horizontally arranged rows of digital spaces wherein the columns represent the consecutive digital values of 1 to 10 and the rows represent equal digital values, and holes are punched in certain of said spaces, said card reader comprising a source of light, a light pulse generator receiving said source and generating light pulses, said generator including an endless belt trained about a drive pulley and an idler pulley spaced from the drive pulley, said light source being within the belt, said belt including a set of holes having a plurality of horizontally arranged rows of holes corresponding to the rows of digital spaces on the card with the number of holes in each row corresponding to the value of the digital spaces of each card row, said card being aligned with said belt to receive the light pulses at the rows of digital value equal to the number of light pulses generated therefor, means for driving the drive pulley to drive the belt at a constant speed, a plurality of photocells, one receiving the light pulse output of each column of digital spaces, and converting same into electrical pulses, cam means operable from said idler shaft, switch means actuable by said cam means to individually and sequentially operate the output of each photocell thereby sequentially reading the digital outputs of each column, and means converting the electrical pulses into a digital output.

13. An optical card reader as defined in claim 12, start switch means operable b said card to start said drive means to initiate a reading cycle, and stop switch means actuable by said cam means for stopping said drive means to complete a reading cycle and to reset said start switch means.

14. An optical card reader as defined in claim 12, wherein said last-named converting means includes a relay.